US012606233B2

(12) United States Patent
Tambo et al.

(10) Patent No.: US 12,606,233 B2
(45) Date of Patent: Apr. 21, 2026

(54) AGRICULTURAL FIELD WORK VEHICLE

(71) Applicant: Kubota Corporation, Osaka (JP)

(72) Inventors: Toru Tambo, Sakai (JP); Yuki Kubota, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 45 days.

(21) Appl. No.: 18/910,238

(22) Filed: Oct. 9, 2024

(65) Prior Publication Data

US 2025/0033689 A1 Jan. 30, 2025

Related U.S. Application Data

(63) Continuation of application No. PCT/JP2023/014407, filed on Apr. 7, 2023.

(30) Foreign Application Priority Data

Apr. 13, 2022 (JP) ................................. 2022-066507

(51) Int. Cl.
B62D 1/28 (2006.01)
B62D 6/00 (2006.01)

(52) U.S. Cl.
CPC ............. B62D 1/286 (2013.01); B62D 6/002 (2013.01)

(58) Field of Classification Search
CPC .. B62D 1/286; B62D 6/002; B60W 2050/007
See application file for complete search history.

(56) References Cited

U.S. PATENT DOCUMENTS

| | | | | |
|---|---|---|---|---|
| 2019/0300044 A1* | 10/2019 | Tsubaki | ................... | B62D 5/04 |
| 2020/0031344 A1* | 1/2020 | Okano | ................... | B62D 1/286 |
| 2021/0397190 A1 | 12/2021 | Takase et al. | | |
| 2023/0202558 A1* | 6/2023 | Ogata | ................... | B62D 15/025 |
| 2024/0324482 A1* | 10/2024 | Saito | ................... | A01B 69/008 |

FOREIGN PATENT DOCUMENTS

JP 2020099225 A 7/2020

OTHER PUBLICATIONS

International Search Report in PCT/JP2023/014407, mailed May 9, 2023, 2 pages.
Written Opinion in PCT/JP2023/014407, mailed May 9, 2023, 3 pages.

* cited by examiner

*Primary Examiner* — Erick R Solis
(74) *Attorney, Agent, or Firm* — Keating & Bennett, LLP

(57) ABSTRACT

An agricultural field work vehicle includes a steered wheel, a steering mechanism including a steering tool to perform a steering operation to steer the steered wheel, an automatic steering controller configured or programmed to change between a non-controlling state in which the automatic steering is not performed and an automatic control state in which the automatic steering is performed and output at least one target steering parameter, and a steering driver to perform drive control on the steering mechanism based on the at least one target steering parameter when the automatic steering controller is in the automatic control state. The steering tool is configured to change a steering amount thereof in conjunction with the drive control by the steering driver. The automatic steering controller is configured or programmed to suppress the at least one target steering parameter in response to a change from the non-controlling state to the automatic control state.

10 Claims, 9 Drawing Sheets

AGRICULTURAL FIELD WORK VEHICLE

CROSS REFERENCE TO RELATED APPLICATIONS

This application claims the benefit of priority to Japanese Patent Application No. 2022-066507 filed on Apr. 13, 2022 and is a Continuation Application of PCT Application No. PCT/JP2023/014407 filed on Apr. 7, 2023. The entire contents of each application are hereby incorporated herein by reference.

BACKGROUND OF THE INVENTION

1. Field of the Invention

The present invention relates to agricultural field work vehicles.

2. Description of the Related Art

For example, the agricultural field work vehicle disclosed in JP 2020-099225A (referred to as a "tractor" in JP 2020-099225A) is equipped with an automatic steering device (referred to as a "controller" in JP 2020-099225A). This automatic steering device is configured to be capable of changing its state between a non-controlling state (referred to as a "manual steering mode" in the document) where automatic steering (referred to as "automatic steering control" in the document) is not performed and an automatic control state (referred to as an "automatic steering mode" in the document) where automatic steering is performed.

SUMMARY OF THE INVENTION

When the automatic steering controller starts automatic steering, the steering mechanism is automatically driven. In addition, the steering tool that accepts manual operation often operates in conjunction with the steering mechanism. At this time, it is conceivable that the steering mechanism may operate at high speed when automatic steering starts, depending on the turning angle of the steered wheels, and may cause the steering tool to move abruptly. Therefore, there is room for improvement with respect to the operation of the steering tool so as not to cause discomfort to the operator.

Example embodiments of the present invention provide agricultural field work vehicles in each of which the comfort of an operator operating a steering tool is taken into consideration.

According to an example embodiment of the present invention, an agricultural field work vehicle capable of performing automatic steering to travel along a target route includes a steered wheel, a steering mechanism including a steering tool capable of accepting a manual operation and operable to perform a steering operation to steer the steered wheel, an automatic steering controller configured or programmed to change a state thereof between a non-controlling state in which the automatic steering is not performed and an automatic control state in which the automatic steering is performed, and output at least one target steering parameter used to travel along the target route in the automatic control state, and a steering driver to perform drive control on the steering mechanism based on the at least one target steering parameter when the automatic steering controller is in the automatic control state, the steering tool being configured to change a steering amount thereof in conjunction with the drive control performed by the steering driver, and the automatic steering controller being configured or programmed to perform suppression processing to suppress the at least one target steering parameter in response to a state change from the non-controlling state to the automatic control state.

According to an example embodiment of the present invention, the automatic steering controller is configured or programmed to perform suppression processing in response to a state change from the non-controlling state to the automatic control state. Therefore, at the start of the automatic control, the target steering parameters for the steering driver are suppressed, and the drive control for the steering mechanism is also suppressed. In addition, the steering amount of the steering tool changes in conjunction with the drive control by the steering driver. As a result, the change in the steering amount of the steering tool is also suppressed. This makes the movement of the steering tool gentle at the start of automatic control, allowing the operator to monitor the movement of the steering tool without any sense of incongruity. An example embodiment of the present invention realizes an agricultural field work vehicle in which the comfort of an operator operating the steering tool is taken into consideration.

In an agricultural field work vehicle according to an example embodiment of the present invention, it is preferable that the steering driver includes an electric motor, the at least one target steering parameter includes a current value for the electric motor, and the automatic steering controller is configured or programmed to suppress the current value when performing the suppression processing.

With this configuration, the electric motor starts to rotate slowly when automatic control starts. Therefore, the movement of the steering tool will be gentle at the start of the automatic control.

It is preferable that an agricultural field work vehicle according to an example embodiment of the present invention further includes a steering angle calculator configured or programmed to calculate a steering angle of the steered wheel, and the at least one target steering parameter includes a first angular velocity that is a target amount of change per unit time in the steering angle, and the automatic steering controller is configured or programmed to suppress the first angular velocity when performing the suppression processing.

With this configuration, the target amount of change per unit time in the steering angle is suppressed at the start of the automatic control. Therefore, the steering angle of the steered wheels does not change significantly at the start of the automatic control, and the movement of the steering tool will be gentle.

It is preferable that an agricultural field work vehicle according to an example embodiment of the present invention further includes a first detector configured to detect at least one of a drive amount of the steering driver and a steering amount of the steering tool, and the steering angle calculator is configured or programmed to calculate the steering angle based on a detection value detected by the first detector.

With this configuration, the steering angle calculator is configured or programmed to calculate the steering angle based on at least either the drive amount of the steering driver or the steering amount of the steering tool.

It is preferable that an agricultural field work vehicle according to an example embodiment of the present invention further includes a second detector configured to detect an orientation of a body of the agricultural field work vehicle, the at least one target steering parameter includes a second angular velocity that is a target amount of change per unit time in the orientation of the body of the vehicle, and the automatic steering controller is configured or programmed to suppress the second angular velocity when performing the suppression processing.

With this configuration, the target amount of change per unit time in the orientation of the body of the vehicle is suppressed at the start of the automatic control. Therefore, the orientation of the body of the vehicle does not change significantly at the start of the automatic control, and the steering angle of the steered wheels does not change significantly either. As a result, the movement of the steering tool will be gentle.

In an agricultural field work vehicle according to an example embodiment of the present invention, it is preferable that the automatic steering controller is configured or programmed to output the at least one target steering parameter in response to a state change from the non-controlling state to the automatic control state so that an amount of change per unit time in a steering amount of the steering tool falls below a predetermined threshold value.

With this configuration, the movement of the steering tool will be gentle at the start of the automatic control.

In an agricultural field work vehicle according to an example embodiment of the present invention, it is preferable that the automatic steering controller is configured or programmed to perform the suppression processing from a start time at which the suppression processing is started to an end time at which a preset time has elapsed from the start time, and the automatic steering controller is configured or programmed to set the at least one target steering parameter to a first parameter at the start time, and to set the at least one target steering parameter to a second parameter greater than the first parameter at the end time.

With this configuration, the target steering parameter is set to the first parameter at the start of the automatic control and the target steering parameter is set to the second parameter greater than the first parameter at the end time at which a preset time has elapsed from the start of the automatic control. Therefore, the movement of the steering gear is gentle at the start of the automatic control, and as time elapses, the movement of the steering tool becomes faster than at the start. This allows the operator to monitor the movement of the steering tool without any sense of incongruity, and also makes it easier for the automatic steering controller to perform steering control to travel along the target route when performing automatic steering.

In an agricultural field work vehicle according to an example embodiment of the present invention, it is preferable that the automatic steering controller is configured or programmed to keep the at least one target steering parameter at the first parameter for at least a preset period from the start time within a period from the start time to the end time.

With this configuration, the target steering parameter is kept at the first parameter for the period from the start time to the preset time. Therefore, a certain period of time for which the movement of the steering tool is gentle is ensured at the start of the automatic steering.

In an agricultural field work vehicle according to an example embodiment of the present invention, it is preferable that the automatic steering controller is configured or programmed to change the at least one target steering parameter to approach the second parameter as time elapses over at least a predetermined period to the end time within a period from the start time to the end time.

With this configuration, the target steering parameter is first set to the first parameter and is then shifted toward the second parameter over time, so that the speed of the movement of the steering tool changes rapidly and steplessly. As a result, the operator can monitor the movement of the steering tool without feeling that the movement of the steering tool is unnatural.

In an agricultural field work vehicle according to an example embodiment of the present invention, it is preferable that the automatic steering controller in the non-controlling state is configured or programmed to change the state thereof to the automatic control state when the agricultural field work vehicle has travelled in a same direction for a predetermined distance or time based on manual operation performed on the steering tool.

With this configuration, automatic steering is started once the agricultural field work vehicle has travelled in the same direction. As a result, although the movement of the steering tool is gentle at the start of automatic steering, the automatic steering controller can smoothly perform automatic steering without causing the agricultural field work vehicle to deviate from the target route.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
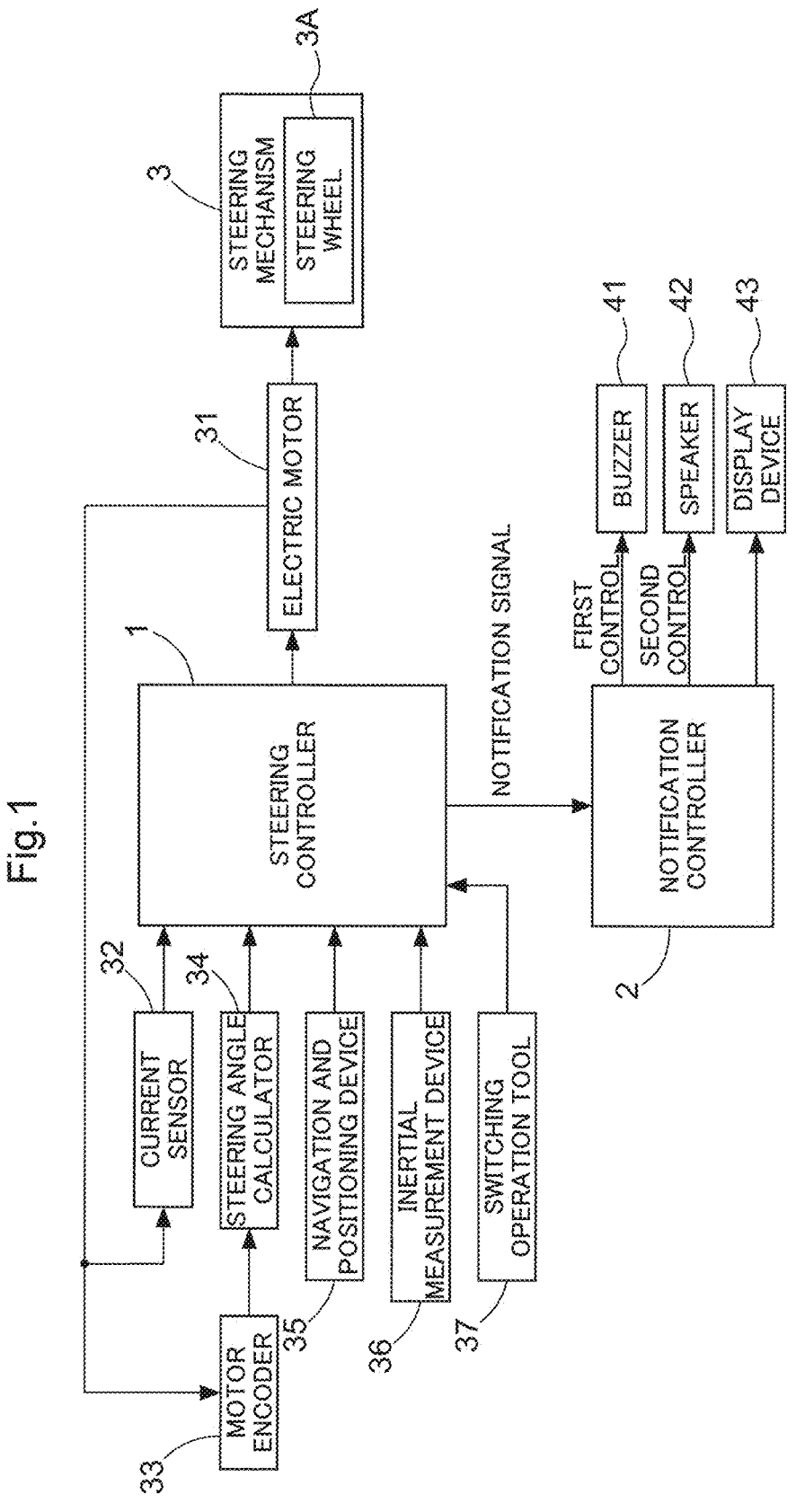
FIG. 1 is a block a diagram showing a steering controller and a notification controller.

Based on FIG. 1, a steering controller 1 and a notification controller 2 installed in an agricultural field work vehicle will be described. The steering controller 1 and the notification controller 2 may each be a physical device such as a microcomputer, or a combination of a device and software. Although not shown, the steering controller 1 and the notification controller 2 each include a storage device. These storage devices are, for example, non-volatile memories (e.g., flash memories) or ROMs such as EEPROMs. The storage devices temporarily or permanently store data generated by each of the functional units included in the steering controller 1 and the notification controller 2. The steering controller 1 is equivalent to the "automatic steering controller".

The steering controller 1 receives as input a detection value from a current sensor 32, a calculation value from a steering angle calculator 34, a positioning signal from a navigation and positioning device 35, and detection values from an inertial measurement device 36. The steering controller 1 outputs a current command value to an electric motor 31. In addition, the steering controller 1 outputs a notification signal to the notification controller 2. The notification signal from the steering controller 1 to the notification controller 2 may be, for example, an interruption control signal or a status signal informing of the control mode of the steering controller 1. The electric motor 31 is equivalent to the "steering driver".

The notification controller 2 is configured or programmed to control a buzzer 41, a speaker 42, and a display device 43 based on a notification signal from the steering controller 1, thus notifying the operator or the like of information relating to automatic steering. The buzzer 41 outputs a sound. The speaker 42 outputs voice guidance. The voice guidance is natural language speech. The display device 43 is, for example, a mobile information terminal, or a touch panel display (a liquid crystal display device or an OLED display device) provided in an on-board device and is configured to display notification information. The mobile information terminal or the on-board device may be configured to also serve as the buzzer 41, the speaker 42, and the display device 43. In addition, the buzzer 41, the speaker 42, and the display device 43 may be integrated into a single unit (e.g., a display panel having the function of emitting a sound).

The electric motor 31 is interlocked with a steering mechanism 3, and when the electric motor 31 is driven, the steering mechanism 3 is driven. The steering mechanism 3 includes a steering wheel 3A, which accepts steering operations from the operator. The steering wheel 3A is equivalent to the "steering tool".

The current sensor 32 detects an actual current value in the electric motor 31. A motor encoder 33 detects the rotation angle of the electric motor 31. The motor encoder 33 is configured or programmed to detect the rotation angle of the electric motor 31 in the range of, for example, −10800 degrees to +10800 degrees. The motor encoder 33 may be, for example, a resolver encoder or an optical encoder. The motor encoder 33 is equivalent to the "first detector".

The steering angle calculator 34 is configured or programmed to calculate the steering angular velocity of the steered wheels (wheels, crawlers, etc.) of the agricultural field work vehicle based on the detection value detected by the motor encoder 33. In addition, the steering angle calculator 34 is configured or programmed to calculate the steering angular velocity of the steered wheels of the agricultural field work vehicle based on the amount of change per unit time in the detection value detected by the motor encoder 33. The steering angular velocity of the steered wheels is the speed at which the orientation of the steered wheels (the steering angle of the steered wheels) changes.

The greater the steering angular velocity, the more abruptly the steering angle of the steered wheels changes.

The navigation and positioning device 35 receives positioning signals from artificial satellites (not shown) used in GNSS (Global Navigation Satellite System, such as GPS, GLONASS, Galileo, QZSS, BeiDou, etc.).

The inertial measurement device 36 is, for example, a gyro acceleration sensor or a magnetic direction sensor and detects the angular velocity of the yaw angle of the agricultural field work vehicle and the acceleration in three mutually orthogonal axial directions over time. The inertial measurement device 36 can calculate the change in the heading angle of the agricultural field work vehicle by integrating the angular velocity. For this reason, the measurement data measured by the inertial measurement device 36 includes data indicating the heading (orientation) of the agricultural field work vehicle. Although not described in detail, the inertial measurement device 36 can measure the angular velocity of the turning angle of the agricultural field work vehicle, as well as the left-right tilt angle and the front-rear tilt angle of the agricultural field work vehicle. In this way, inertial measurement device 36 detects the orientation of the body of the agricultural field work vehicle. The inertial measurement device 36 is equivalent to the "second detector".

The steering controller 1 is configured or programmed to calculate the position coordinates of the agricultural field work vehicle over time based on the positioning data output by the navigation and positioning device 35. This allows the steering controller 1 to acquire the position coordinates of the agricultural field work vehicle. Furthermore, the steering controller 1 is configured or programmed to calculate the attitude and heading of the agricultural field work vehicle based on the position coordinates of the agricultural field work vehicle and the detection values detected by the inertial measurement device 36. The attitude and heading of the agricultural field work vehicle is the direction in which the agricultural field work vehicle travels straight and forward or backward.

The following description will be given with reference to FIG. 3. First, while a tractor 5, which is an example of the agricultural field work vehicle, is travelling, the steering controller 1 is configured or programmed to calculate initial attitude and heading based on the current position coordinates of the tractor 5 and the position coordinates of the tractor 5 at the point where it was travelling immediately before. Next, when the tractor 5 travels for a certain period of time after the initial attitude and heading has been calculated, the steering controller 1 is configured or programmed to calculate the amount of change in the heading by integrating the angular velocity detected by the inertial measurement device 36 during that certain period of travel.

Thereafter, the steering controller 1 updates the calculation result of the heading by adding the amount of change in the heading calculated in this manner to the initial attitude and heading. Thereafter, the amount of change in the attitude and heading is calculated in the same manner at regular time intervals, and the calculation results of the attitude and heading are successively updated. With the above configuration, the steering controller 1 is configured or programmed to calculate the heading of the tractor 5.

Figure 3:
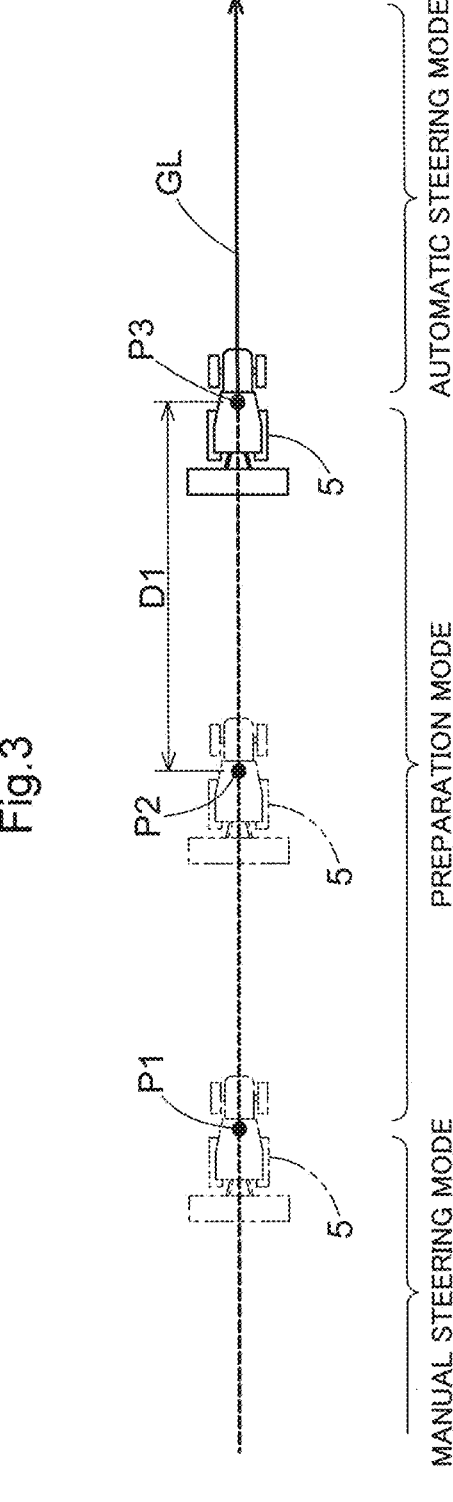
FIG. 3 is a diagram showing a transition from a manual steering mode to an automatic steering mode.

The steering mechanism 3 shown in FIG. 1 is configured to steer the front wheels of the tractor 5 in the example embodiment shown in FIG. 3. The steering controller 1 is configured or programmed to control the steering mechanism 3 and to execute automatic steering to enable the tractor 5 to automatically travel along an automatic steering target line GL.

Figure 2:
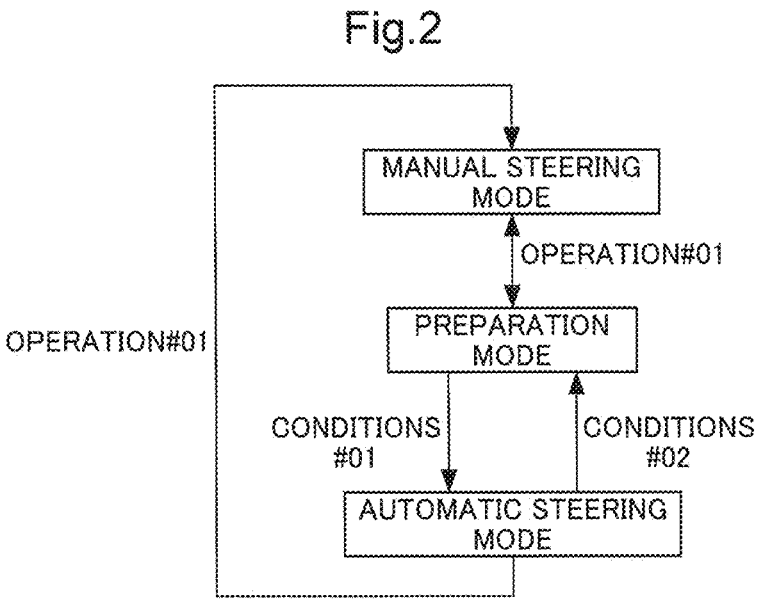
FIG. 2 is a diagram showing transitions between control modes of the steering controller.

As shown in FIG. 2, the steering controller 1 includes a plurality of control modes to control the steering mechanism 3. It is possible to switch between the plurality of control modes including a manual steering mode in which automatic steering is not executed and an automatic steering mode in which automatic steering can be executed. A switching operation tool 37 shown in FIG. 1 accepts a manual operation (human operation) to switch between the control modes of the steering controller 1.

When the control mode of the steering controller 1 is the manual steering mode, the steering controller 1 does not output a current command value to the electric motor 31. At this time, the wheels or crawlers of the agricultural field work vehicle are steered in response to a manual operation performed on a steering wheel 3A of the steering mechanism 3. Therefore, when the control mode of the steering controller 1 is the manual steering mode, the state of the steering controller 1 is a non-controlling state in which the automatic steering is not performed. In this case, the steering controller 1 outputs various notification signals to the notification controller 2 based on a detection value from the current sensor 32, a calculation value from the steering angle calculator 34, a positioning signal from the navigation and positioning device 35, and a detection value from the inertial measurement device 36.

The steering controller 1 is configured or programmed to control the steering of the agricultural field work vehicle when the control mode of the steering controller 1 is the automatic steering mode so that the agricultural field work vehicle can perform automatic steering travel along the automatic steering target line GL (see FIG. 3) based on the positioning data output by the navigation positioning device 35 and the detection values detected by the inertial measurement device 36. The automatic steering target line GL is equivalent to the "target route".

The steering controller 1 is configured or programmed to switch between the control modes based on an operation signal from the switching operation tool 37 and the condition of the agricultural field work vehicle. As described above, the switching operation tool 37 accepts a manual operation to switch the control mode of the steering controller 1 to the automatic steering mode. The operation on the switching operation tool 37 is shown as "operation #01" in FIG. 2. When the operation #01 is performed, the steering controller 1 switches the control mode from the manual steering mode to a preparation mode.

The steering controller 1 outputs a notification signal to the notification controller 2 when switching the control mode from the manual steering mode to the preparation mode. Thereafter, based on the notification signal from the steering controller 1, the notification controller 2 notifies the operator that the preparation for the transition to the automatic steering mode has been started. That is to say, the notification controller 2 causes the buzzer 41 to output a sound, the speaker 42 to output voice guidance, and the display device 43 to display notification information based on the notification signal from the steering controller 1.

The preparation mode is a control mode in which the preparation for the start of the automatic steering is performed, and manual steering by the operator continues in this preparation mode. Therefore, when the control mode of the steering controller 1 is the preparation mode, the state of the steering controller 1 is a non-controlling state in which the automatic steering is not performed. Note that when the operation #01 is performed when the control mode of the steering controller 1 is the preparation mode, the steering controller 1 switches the control mode of the steering controller 1 from the preparation mode to the manual steering mode.

In the preparation mode, the steering controller 1 determines whether or not conditions #01 for the transition to the automatic steering mode are met. At this time, the operator manually operates the agricultural field work vehicle to prepare the conditions for the transition to the automatic steering mode. That is to say, based on the preparation mode, the operator performs manual steering to align the attitude and heading of the agricultural field work vehicle with a preset reference heading. The preset reference heading is, for example, a heading that has been set based on two points, the start point and the end point, of a teaching travel.

FIG. 3 shows a state in which the operation #01 is performed at a point P1 so that the control mode of the steering controller 1 is switched from the manual steering mode to the preparation mode, and the tractor 5 travels from the point P1 to a point P2 based on manual steering.

The conditions #01 for the transition from the preparation mode to the automatic steering mode are, for example, that the main shift lever (not shown) operated by the operator is set to the forward position, that a clutch (not shown, e.g., a PTO clutch) to transmit power to a work implement (not shown) of the agricultural field work vehicle is in a power transmitting state, that the difference between the attitude and heading of the agricultural field work vehicle and a preset reference heading is within a preset angle (e.g., 3 degrees), and so on.

In the preparation mode, the steering controller 1 outputs a notification signal to the notification controller 2. Thereafter, based on the notification signal from the steering controller 1, the notification controller 2 notifies the operator of guidance information for satisfying the conditions #01. That is to say, based on the notification signal from the steering controller 1, the notification controller 2 causes the buzzer 41 to output a sound, causes the speaker 42 to output the content of the operation to be performed to satisfy the conditions #01, and causes the display device 43 to display the content of the operation to be performed to satisfy the conditions #01.

If the control mode is the preparation mode and the necessary items of the conditions #01 are met, it is possible to switch to the automatic steering mode. When the agricultural field work vehicle travels a predetermined distance D1 in this state as shown in FIG. 3, the steering controller 1 generates the automatic steering target line GL and the control mode transitions from the preparation mode to the automatic steering mode. The automatic steering target line GL extends along the preset reference heading.

FIG. 3 shows a state in which the conditions #01 are met at the point P2 and the tractor 5 travels the predetermined distance D1 from the point P2 to a point P3. The predetermined distance D1 is not particularly limited and may be, for example, 1 meter.

The steering controller 1 outputs a notification signal to the notification controller 2 while the agricultural field work vehicle travels the predetermined distance D1. The notification controller 2 notifies the operator of the start of the automatic steering. At this time, based on the notification signal from the steering controller 1, the notification controller 2 causes the buzzer 41 to output a sound, causes the speaker 42 to output voice guidance saying, "Automatic steering will start soon", and causes the display device 43 to display notification information. This configuration allows the operator to know when to release his/her hands from the steering wheel 3A.

In this way, the steering controller 1 is configured or programmed to change its state to the automatic control state when the tractor 5 travels the predetermined distance D1 set in advance in the same direction based on a manual operation performed on the steering wheel 3A in the non-controlling state. Note that the steering controller 1 may be configured or programmed to change its state to the automatic control state when the tractor 5 has traveled for a preset time (e.g., three to five seconds) in the same direction based on a manual operation performed on the steering wheel 3A in the non-controlling state.

When the control mode of the steering controller 1 is the automatic steering mode, the state of the steering controller 1 is an automatic control state in which automatic steering is performed. Therefore, in the automatic control state, the steering controller 1 outputs to the electric motor 31 a current command value to instruct the agricultural field work vehicle to travel along the automatic steering target line GL.

A method for canceling the automatic steering mode will now be described. When "conditions #02" shown in FIG. 2 are detected during the execution of the automatic steering, the steering controller 1 ends the automatic steering. The "conditions #02" are conditions for stopping work. The conditions #02 are, for example, that the main shift lever operated by the operator is moved to an operating position other than the forward position, that the clutch to transmit power to the work implement of the agricultural field work vehicle is put into a power non-transmitting state, that the steering wheel 3A is manually moved in the left-right direction by an amount larger than a preset operating amount, and so on.

If any one of the items listed as the conditions #02 is met, the automatic steering is cancelled and the control mode of the steering controller 1 transitions from the automatic steering mode to the preparation mode. At this time, the steering controller 1 outputs a notification signal to the notification controller 2. Thereafter, based on the notification signal from the steering controller 1, the notification controller 2 notifies the operator of the end of the automatic steering by causing the buzzer 41 to output a sound, causing the speaker 42 to output voice guidance, and causing the display device 43 to display notification information.

Even if one of the items listed as the conditions #02 is met and the automatic steering ends, the control mode of the steering controller 1 transitions to the preparation mode and does not return to the manual steering mode. Therefore, the automatic steering can be resumed when the above conditions #01 are met. For this reason, for example, if the operator performs an operation corresponding to the conditions #02 at the edge of an agricultural field, and then turns the agricultural field work vehicle by 90 degrees or 180 degrees and travels along the preset reference heading, the above conditions #01 can be met. This will resume the automatic steering directly.

In this way, the steering controller 1 is configured or programmed to change its state between a non-controlling state in which the automatic steering is not executed and an automatic control state in which the automatic steering is executed.

Note that when the control mode of the steering controller 1 is the automatic steering mode and the operator presses the switching operation tool 37 (the operation #01) during the automatic steering, the steering controller 1 switches the control mode of the steering controller 1 from the automatic steering mode to the manual steering mode, and the automatic steering executed by the steering controller 1 ends. When the automatic steering is cancelled, the current command value output from the steering controller 1 to the electric motor 31 becomes zero.

Figure 4:
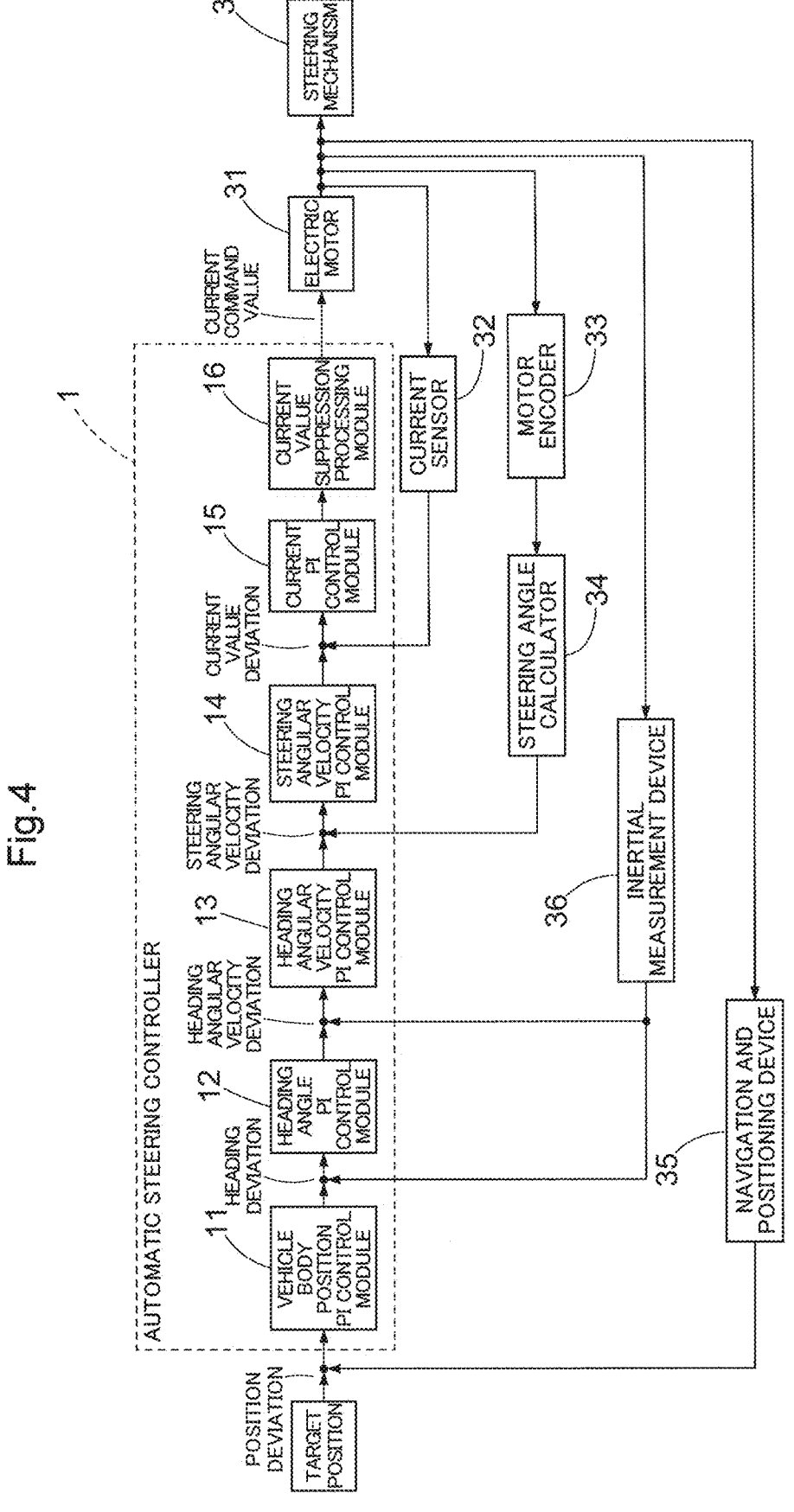
FIG. 4 is a block diagram showing automatic steering control in the steering controller.

The automatic steering control in the present example embodiment will be described with reference to FIG. 4. The steering controller 1 includes a plurality of modules. The steering controller 1 includes a vehicle body position PI control module 11, a heading angle PI control module 12, a heading angular velocity PI control module 13, a steering angular velocity PI control module 14, a current PI control module 15, and a current value suppression processing module 16.

The vehicle body position PI control module 11 calculates a position deviation amount, which is the difference between the target position to be reached by the agricultural field work vehicle travelling along the automatic steering target line GL and the actual position coordinates of the agricultural field work vehicle based on the positioning signal from the navigation positioning device 35. The position deviation amount is the amount of positional deviation to the right or left in the direction of travel with respect to the automatic steering target line GL. The vehicle body position PI control module 11 calculates the target heading for the agricultural field work vehicle to travel along the automatic steering target line GL based on the position deviation amount.

The heading angle PI control module 12 calculates a heading deviation amount, which is the difference between the target heading calculated by the vehicle body position PI control module 11 and the actual heading of the agricultural field work vehicle measured by the inertial measurement device 36. Thereafter, the heading angle PI control module 12 calculates a target heading angular velocity to align the heading of the agricultural field work vehicle with the target heading based on the heading deviation amount. The target heading angular velocity to align the heading of the agricultural field work vehicle to the target heading is the target amount of change per unit time in the orientation of the body of the agricultural field work vehicle.

The heading angular velocity PI control module 13 calculates a heading angular velocity deviation amount, which is the difference between the target heading angular velocity calculated by the heading angle PI control module 12 and the actual heading angular velocity measured by the inertial measurement device 36. The heading angular velocity PI control module 13 calculates a target steering angular velocity of the steered wheels for turning the agricultural field work vehicle in accordance with the target heading angular velocity, based on the heading angular velocity deviation amount. The target steering angular velocity of the steered wheels is a target amount of change per unit time in the steering angle of the steered wheels.

The steering angular velocity PI control module 14 calculates a steering angular velocity deviation amount, which is the difference between the target steering angular velocity calculated by the heading angular velocity PI control module 13 and the actual steering angular velocity of the steered wheels calculated by the steering angle calculator 34. The steering angular velocity PI control module 14 calculates a target current value for the electric motor 31 based on the steering angular velocity deviation amount.

The current PI control module 15 calculates a current value deviation amount, which is the difference between the target current value calculated by the steering angular velocity PI control module 14 and the actual current value of the electric motor 31 detected by the current sensor 32. The current PI control module 15 adjusts the above target current value based on the current value deviation amount, and outputs a more appropriate current command value to the electric motor 31. With this configuration, when the steering controller 1 is in the automatic control state, the electric motor 31 drives and controls the steering mechanism 3 based on the current command value. When the agricultural field work vehicle is the tractor 5 shown in FIG. 3, the front wheels of the tractor 5 are steered by driving the steering mechanism 3. Thereafter, the steering angle of the steered wheels is adjusted, and the agricultural field work vehicle travels along the automatic steering target line GL. The current command value is equivalent to the "at least one target steering parameter". In other words, the at least one target steering parameter includes the current command value for the electric motor 31.

In the steering controller 1 according to the present example embodiment, at the start time of automatic steering control, the current command value calculated by the current PI control module 15 is not output as is, and the current value suppression processing module 16 sets the current command value to be smaller and outputs it to the electric motor 31. The following describes current command value suppression processing performed at the start of the automatic steering.

When the control mode of the steering controller 1 is switched from the manual steering mode to the automatic steering mode via the preparation mode, the steering controller 1 starts the automatic steering control of the agricultural field work vehicle. When the steering controller 1 starts the automatic steering control of the agricultural field work vehicle, a large current command value may be output from the steering controller 1 depending on the turning angle of the steered wheels and may cause the steering mechanism 3 to drive at high speed.

The steering wheel 3A turns in response to the driving of the steering mechanism 3. In other words, the steering wheel 3A is configured to change the steering amount in conjunction with the drive control of the steering mechanism 3 by the electric motor 31. Therefore, when the steering mechanism 3 drives at high speed, the steering wheel 3A turns at high speed. If this occurs, the steering wheel 3A may turn abruptly at the start of the automatic steering control, which may be surprising or uncomfortable for the operator.

To avoid such inconvenience, in the present example embodiment, the current value suppression processing module 16 performs processing to suppress abrupt movements of the steering wheel 3A at the start time of the automatic steering control. In other words, the steering controller 1 is configured or programmed to perform suppression processing to suppress the current command value for the electric motor 31 when its state is changed from the non-controlling state to the automatic controlled state. To rephrase, the steering controller 1 is configured or programmed to output a current command value to the electric motor 31 in response to a state change from the non-controlling state to the automatic control state so that the amount of change per unit time in the steering amount of the steering wheel 3A falls below a predetermined threshold value.

Figure 5:
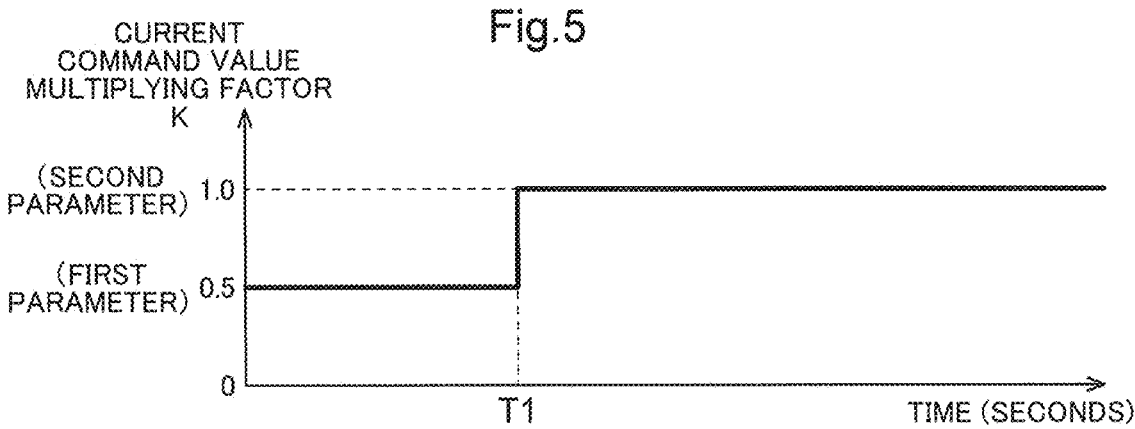
FIG. 5 is a graph showing suppression processing performed to suppress a current command value at the start of automatic steering.
Figure 6:
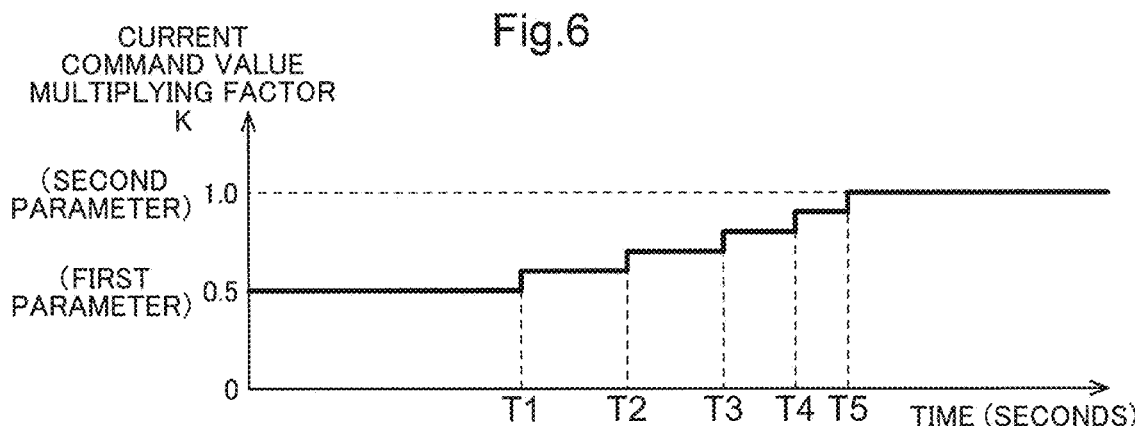
FIG. 6 is a graph showing the suppression processing performed to suppress a current command value at the start of automatic steering.
Figure 7:
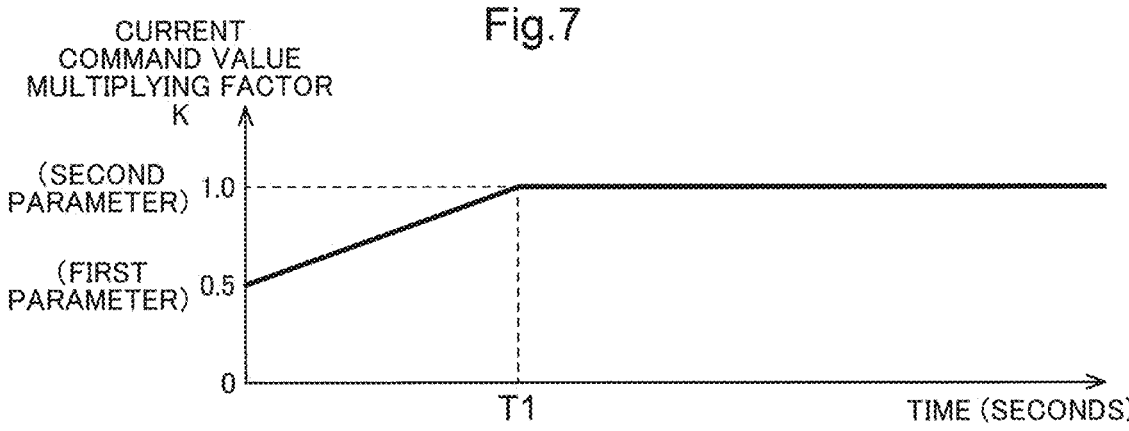
FIG. 7 is a graph showing the suppression processing performed to suppress a current command value at the start of automatic steering.

FIGS. 5 to 7 show examples of the suppression processing performed to suppress the current command value for the electric motor 31. In the present example embodiment, a multiplying factor K for the current command value is prepared. The current value suppression processing module 16 sets the multiplying factor K within the range from a first parameter to a second parameter, and multiplies the current command value calculated by the current PI control module 15 by the multiplying factor K. In the examples shown in FIGS. 5 to 7, 0.5 is shown as the first parameter of the multiplying factor K, and 1.0 is shown as the second parameter of the multiplying factor K, for example. The multiplying factor K is equivalent to the "at least one target steering parameter". In other words, the at least one target steering parameter includes the multiplying factor K.

When the multiplying factor K is 1.0, the current value suppression processing module 16 outputs the current command value calculated by the current PI control module 15 to the electric motor 31 as is, for example. When the multiplying factor K is 0.5, the current value suppression processing module 16 suppresses the current command value calculated by the current PI control module 15 to half the current value and outputs it to the electric motor 31, for example.

In the example shown in FIG. 5, the current value suppression processing module 16 sets the multiplying factor K to 0.5 (the first parameter) until a preset time T1 has elapsed from the start of the automatic steering control, for example. The preset time T1 is set to, for example, 5 seconds. The preset time T1 shown in FIG. 5 is the end time at which the suppression processing ends, for example. That is to say, the steering controller 1 is configured to perform suppression processing from the start time at which the suppression processing is started to the end time at which the preset time T1 has elapsed from the start time.

During the period from the start time of the automatic steering control to the elapse of the preset time T1, the current value suppression processing module 16 suppresses the current command value calculated by the current PI control module 15 to half the current value and outputs it to the electric motor 31. That is to say, the current value suppression processing module 16 of the steering controller 1 is configured to keep the multiplying factor K at 0.5 (the first parameter) during the period from the start time to the preset time T1, for example. Thereafter, the current value suppression processing module 16 changes the multiplying factor K stepwise from 0.5 (the first parameter) to 1.0 (the second parameter) when the preset time T1 has elapsed, for example. In addition, the current value suppression processing module 16 thereafter outputs the current command value calculated by the current PI control module 15 to the electric motor 31 as is, for example.

In the example shown in FIG. 6, the current value suppression processing module 16 sets the multiplying factor K to 0.5 (the first parameter) at the start time of the automatic steering control, for example. A preset time T5 shown in FIG. 6 is the time at which the suppression processing ends. The current value suppression processing module 16 changes the multiplying factor K in a plurality of steps within the range from 0.5 (the first parameter) to 1.0 (the second parameter) from the start of the automatic steering control until the preset time T5 has elapsed, for example. In the example shown in FIG. 6, the multiplying factor K is changed in five steps, for example. Note that, in the example shown in FIG. 6, the multiplying factor K is not limited to being changed in five steps and may be changed appropriately in any number of steps equal to or greater than two.

In the example shown in FIG. 6, the current value suppression processing module 16 sets the multiplying factor K to 0.5 (the first parameter) until the preset time T1 has elapsed from the start of the automatic steering control, for example. This allows the current command value calculated by the current PI control module 15 to be suppressed to half the current value. The current value suppression processing module 16 increases the multiplying factor K by, for example, 0.1 at each of preset times T1, T2, T3, T4, and T5. At the preset time T5, the multiplying factor K reaches 1.0 (the second parameter), for example. That is to say, the current value suppression processing module 16 of the steering controller 1 is configured to change the multiplying factor K stepwise so that the multiplying factor K approaches 1.0 (the second parameter) over the period from the start time of the automatic steering control to the preset time T5, for example. After the preset time T5 has elapsed, the current value suppression processing module 16 thereafter outputs the current command value calculated by the current PI control module 15 to the electric motor 31 as is, for example.

In the example shown in FIG. 7, the current value suppression processing module 16 sets the multiplying factor K to 0.5 (the first parameter) at the start time of the automatic steering control, for example. The current value suppression processing module 16 proportionally changes the multiplying factor K within the range from 0.5 (the first parameter) to 1.0 (the second parameter) from the start of the automatic steering control until the preset time T1 has elapsed, for example. The preset time T1 is set to, for example, 5 seconds. The preset time T1 shown in FIG. 7 is the time at which the suppression processing ends, for example. That is to say, the current value suppression processing module 16 of the steering controller 1 is config- ured to change the multiplying factor K so that the multi- plying factor K approaches 1.0 (the second parameter) as time elapses over the period from the start time of the automatic steering control to the preset time T1, for example. After the preset time T1 has elapsed, the current value suppression processing module 16 thereafter outputs the current command value calculated by the current PI control module 15 to the electric motor 31 as is, for example.

In this way, the steering controller 1 is configured to set the multiplying factor K to the first parameter at the start time of the automatic steering control, and to set the mul- tiplying factor K to the second parameter larger than the first parameter at the end time of the automatic steering control after the preset time T1 (the preset time T5 in FIG. 6) has elapsed. With this configuration, at the start time of the automatic steering control, the amount of change per unit time in the steering amount of the steering wheel 3A becomes smaller than in a configuration in which suppres- sion processing is not performed, and the steering wheel 3A starts to rotate at a slower speed. As a result, the steering controller 1 is configured or programmed to output a current command value to the electric motor 31 in response to a state change from the non-controlling state to the automatic control state so that the amount of change per unit time in the steering amount of the steering wheel 3A falls below a predetermined threshold value.

The notification controller 2, the buzzer 41, the speaker 42, and the display device 43 shown in FIG. 1 are configured to notify the operator of various types of information related to automatic steering according to the control mode of the steering controller 1. The various types of information related to the automatic steering include, for example, information to alert the operator, guidance information to inform the method of operator, and information to inform the operator of the states of the devices in the agricultural field work vehicle. The notification controller 2 is, for example, a voice synthesis LSI, and is disposed separately from the buzzer 41, the speaker 42, and the display device 43. The buzzer 41, the speaker 42, and the display device 43 are disposed in appropriate positions in the cockpit of the agricultural field work vehicle and are connected to the notification controller 2 by wiring.

The notification controller 2 is configured or programmed to control the buzzer 41, the speaker 42, and the display device 43. The operator can recognize various types of information related to the automatic steering based on the sounds and displays output from the buzzer 41, speaker 42, and the display device 43.

When manually operating the agricultural field work vehicle, the operator often makes fine adjustments to the position and speed of the agricultural field work vehicle while visually checking the surroundings in the agricultural field, crop positions, etc. Therefore, it is conceivable that when the operator tries to start the automatic steering of the agricultural field work vehicle, the operator may be unable to visually check the display device 43 while visually checking the surroundings in the agricultural field, crop positions, etc. In particular, if the operator is unfamiliar with switching the control mode of the steering controller 1 to the automatic steering mode, it may be difficult for the operator to understand what to do to cause the agricultural field work vehicle to start the automatic steering while visually check- ing the surroundings in the agricultural field, crop positions, etc. If this is the case, the automatic steering function of the agricultural field work vehicle will be difficult for the operator to use.

In the present example embodiment, various types of information related to the automatic steering are output from the speaker 42 as natural language speech. This allows the operator to know what to do to cause the agricultural field work vehicle to start automatic steering at the appropriate time, while visually checking the surroundings in the agri- cultural field, crop positions, etc. In other words, the opera- tor can perform an operation to cause the agricultural field work vehicle to start the automatic steering by following the voice guidance output from the speaker 42 while visually checking the surroundings in the agricultural field, crop positions, etc. without looking at the display device 43. This allows the operator to concentrate on checking the surround- ings in the agricultural field, crop positions, etc.

In addition, even if the operator is unfamiliar with switch- ing the control mode of the steering controller 1 to the automatic steering mode, it is easy for the operator to cause the agricultural field work vehicle to start the automatic steering by following the voice guidance output from the speaker 42. This makes the automatic steering function of the agricultural field work vehicle easy for the operator to use.

Examples of voice guidance output from the speaker 42 include messages such as "Please switch to the automatic steering mode", "Warming up", "Please register start (or end) point", "Please take your seat", "Please turn the body left (or right)", "A malfunction has been detected", "Posi- tioning level has decreased", "Automatic steering will start soon", and "Good work".

As described above, the notification controller 2 is con- figured or programmed to control the buzzer 41, the speaker 42, and the display device 43 based on a notification signal from the steering controller 1, thus notifying the operator or the like of information relating to automatic steering.

Figure 8:
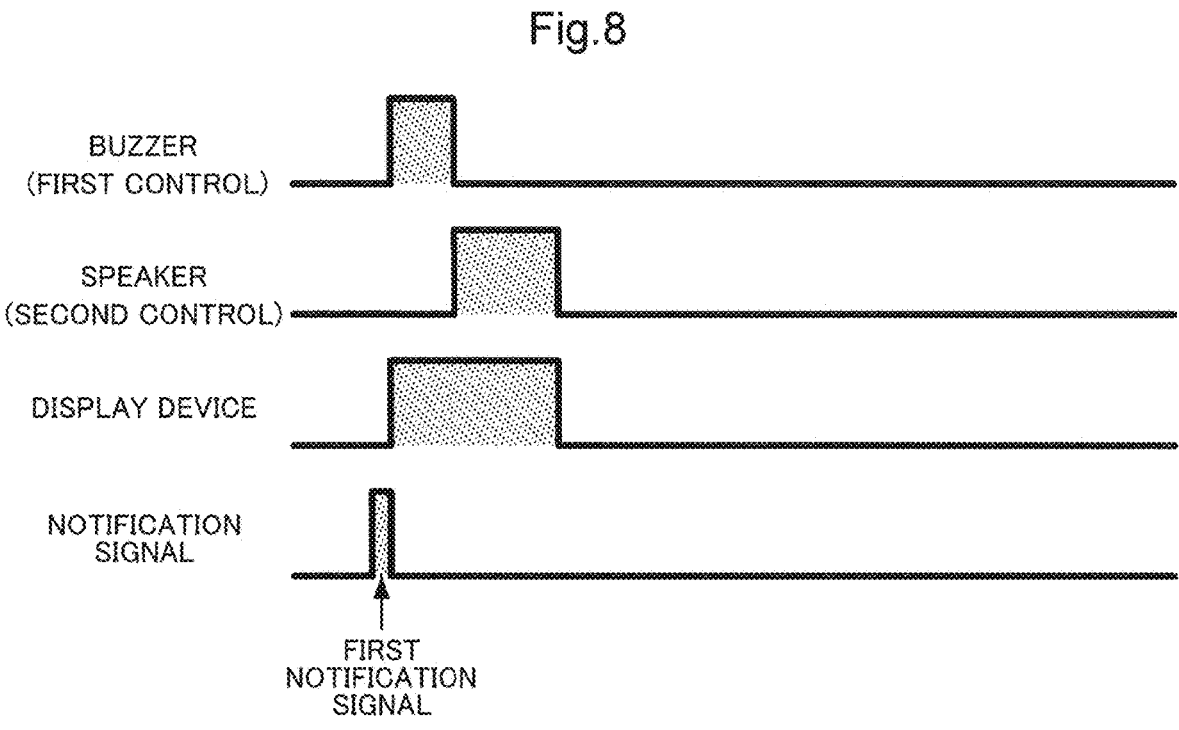
FIG. 8 is a logic graph showing output processing performed by the notification controller.

FIG. 8 shows a first notification signal as an example of the notification signal. As shown in FIG. 8, upon receiving a notification signal from the steering controller 1, the notification controller 2 executes control over the buzzer 41 and the speaker 42. The notification controller 2 is config- ured or programmed to, at this time, first execute a first control to cause the buzzer 41 to output a sound and execute a second control to cause the speaker 42 to output voice guidance after the buzzer 41 completes outputting the sound.

That is to say, the sound from the buzzer 41 and the voice guidance from the speaker 42 do not overlap, and the voice guidance is output from the speaker 42 after the sound from the buzzer 41 stops. This makes it easier for the operator to hear the voice guidance from the speaker 42.

Notification information is displayed by the display device 43 in conjunction with each of the outputs of a sound from the buzzer 41 and voice guidance from the speaker 42. The notification controller 2 is configured to, when first executing the first control to cause the buzzer 41 to output a sound, cause the buzzer 41 to output the sound and, at the same time, cause the display device 43 to display notification information. That is to say, the display device 43 starts displaying the notification information at the same time that the buzzer 41 starts outputting the sound.

The display device 43 is configured to, once the display device 43 starts displaying notification information, continue displaying the notification information until the speaker 42 completes outputting the voice guidance. The notification controller 2 causes the display device 43 to display content similar to the content of the voice guidance from the speaker 42. That is to say, the content of the notification information displayed on the display device 43 is linked to the content of the voice guidance from the speaker 42. When the voice guidance from the speaker 42 ends, the display device 43 stops displaying the notification information related to the automatic steering and switches to another screen. That is to say, the display device 43 stops displaying the notification information at the same time that the speaker 42 stops outputting the voice guidance.

There are a plurality of types of notification signals output from the steering controller 1. Notification signals are classified into types according to priority. That is to say, the notification signals that the steering controller 1 can output include a plurality of notification signals each corresponding to a priority.

Figure 9:
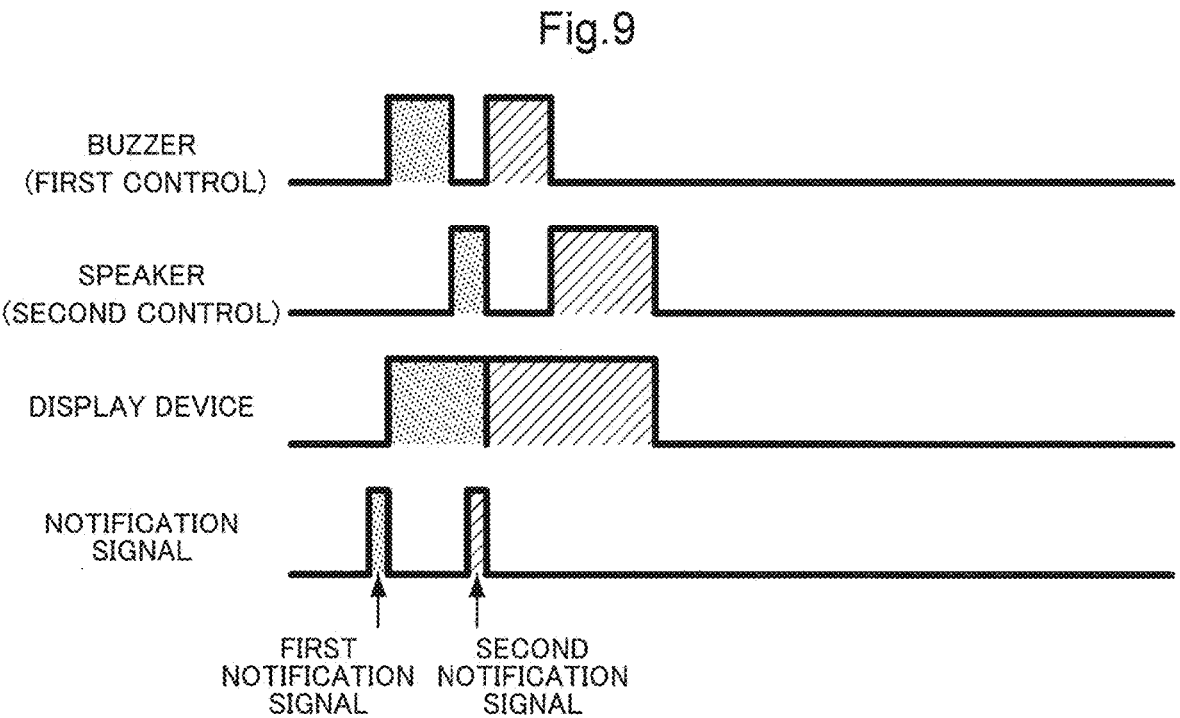
FIG. 9 is a logic diagram showing the output processing performed by the notification controller.

In the example shown in FIG. 9, a first notification signal and a second notification signal are shown as the plurality of notification signals. The second notification signal has a higher priority than the first notification signal. That is to say, in the present example embodiment, the plurality of notification signals include a first notification signal and a second notification signal that has a higher priority than the first notification signal.

In the example shown in FIG. 9, after the first notification signal is output, the notification controller 2 first executes the first control to cause the buzzer 41 to output a sound based on the first notification signal. Then, after the buzzer 41 completes outputting the sound, the notification controller 2 executes the second control to cause the speaker 42 to output voice guidance based on the first notification signal. However, in the example shown in FIG. 9, before the notification controller 2 completes the execution based on the first notification signal of the second control, the second notification signal, which has a higher priority than the first notification signal, is output. The notification controller 2 is configured or programmed to, in this case, stop the execution based on the first notification signal of the first control and the second control. The notification controller 2 is configured or programmed to then execute the first control and the second control based on the second notification signal.

In the example shown in FIG. 9, when the second notification signal is output, the notification controller 2 has completed the first control based on the first notification signal, and the buzzer 41 has completed outputting the sound. However, for example, if the second notification signal is output before the notification controller 2 completes the execution based on the first notification signal of the first control, the notification controller 2 immediately stops the execution based on the first notification signal of the first control. The buzzer sound based on the first notification signal of the buzzer 41 stops before output is completed. That is to say, the buzzer 41 is configured to, when the second notification signal is output, output a sound based on the second notification signal without completing the output based on the first notification signal of the sound.

In the example shown in FIG. 9, at the time immediately before the second notification signal is output, the notification controller 2 is in the middle of executing the second control based on the first notification signal, and the speaker 42 is in the middle of outputting voice guidance. When the second notification signal is output, the notification controller 2 immediately stops the execution based on the first notification signal of the second control. The voice guidance from the speaker 42 based on the second notification signal stops before output is completed. That is to say, the speaker 42 is configured to, when the second notification signal is output, immediately stop the output based on the first notification signal of the voice guidance, and output voice guidance based on the second notification signal after the buzzer 41 completes outputting the sound based on the second notification signal.

In the example shown in FIG. 9, at the time immediately before the second notification signal is output, the notification controller 2 is executing control to cause the display device 43 to display notification information based on the first notification information, and the display device 43 is displaying the notification information based on the first notification information. When the second notification signal is output, the notification controller 2 immediately stops the control based on the first notification signal of the display device 43 and executes the control based on the second notification signal of the display device 43. Thereafter, the display on the display device 43 is switched from the display based on the first notification signal to the display based on the second notification signal. In addition, the display device 43 ends the display based on the second notification signal of the notification information at the same time as the speaker 42 ends the output based on the second notification signal of the voice guidance.

Figure 10:
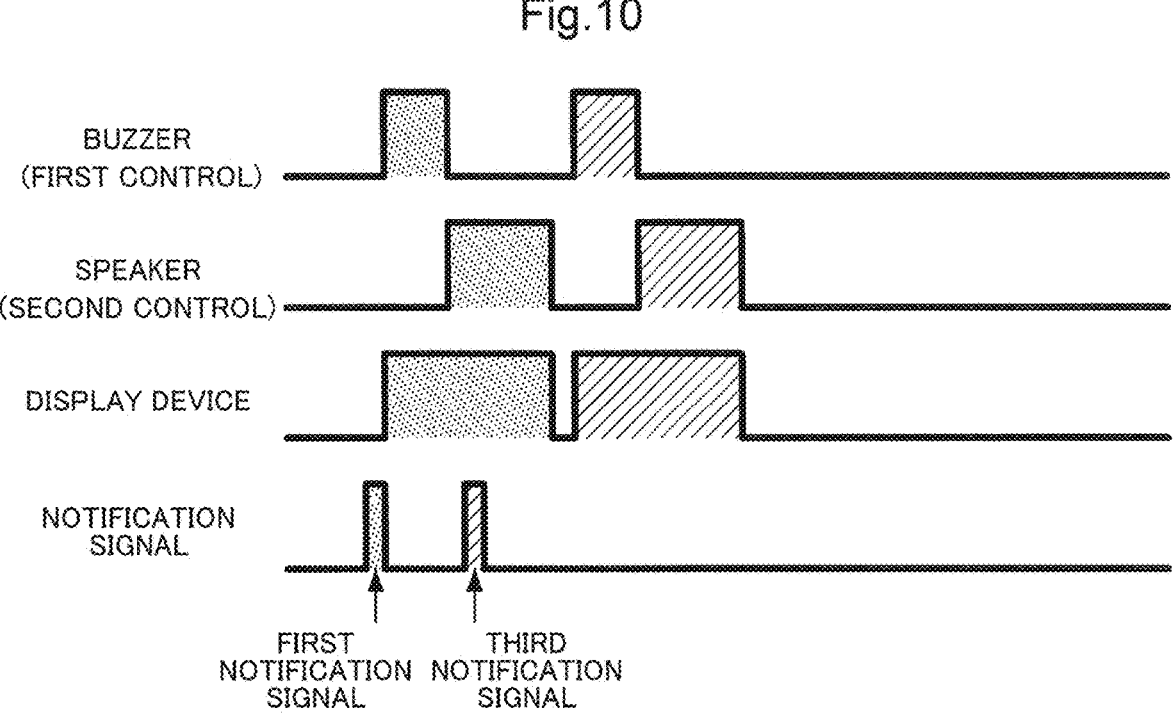
FIG. 10 is a logic graph showing the output processing performed by the notification controller.

In the example shown in FIG. 10, a first notification signal and a third notification signal are shown as the plurality of notification signals. The third notification signal has the same priority as the first notification signal or a lower priority than the first notification signal. That is to say, in the present example embodiment, the plurality of notification signals include a first notification signal and a third notification signal that has the same priority as the first notification signal or a lower priority than the first notification signal.

In the example shown in FIG. 10, after the first notification signal is output, the notification controller 2 first executes the first control to cause the buzzer 41 to output a sound based on the first notification signal. Then, after the buzzer 41 completes outputting the sound, the notification controller 2 executes the second control to cause the speaker 42 to output voice guidance based on the first notification signal. In the example shown in FIG. 10, the third notification signal is output before the notification controller 2 completes the execution of the second control based on the first notification signal. The notification controller 2 is configured or programmed to, in this case, continue the execution based on the first notification signal of the first control and the second control. The notification controller 2 is configured or programmed to, after completing the execution of the first control and the second control based on the first notification signal, execute the first control and the second control based on the third notification signal.

In the example shown in FIG. 10, when the third notification signal is output, the notification controller 2 has completed the first control based on the first notification signal, and the buzzer 41 has completed outputting the sound. For example, even if the third notification signal is output before the notification controller 2 completes the execution based on the first notification signal of the first control, the notification controller 2 continues the execution based on the first notification signal of the first control. That is to say, the buzzer 41 is configured to, when the third notification signal is output, output the sound based on the third notification signal after the buzzer 41 completes the output based on the first notification signal of the sound and the speaker 42 completes the output based on the first notification signal of the voice guidance.

In the example shown in FIG. 10, at the time immediately before the third notification signal is output, the notification controller 2 is in the middle of executing the second control based on the first notification signal, and the speaker 42 is in the middle of outputting voice guidance. When the third notification signal is output, the notification controller 2 continues the execution of the second control based on the first notification signal. That is to say, the speaker 42 is configured to, when the third notification signal is output, complete the output of the voice guidance based on the first notification signal and then, after the buzzer 41 completes outputting the sound based on the third notification signal, output voice guidance based on the third notification signal.

In the example shown in FIG. 10, at the time immediately before the third notification signal is output, the notification controller 2 is executing control to cause the display device 43 to display notification information based on the first notification information, and the display device 43 is displaying the notification information based on the first notification information. When the third notification signal is output, the notification controller 2 continues the control based on the first notification signal of the display device 43, and after the voice guidance from the speaker 42 based on the first notification signal is completed, the notification controller 2 executes the control based on the third notification signal of the display device 43. That is to say, the display on the display device 43 switches from the display based on the first notification signal to the display based on the third notification signal when the voice guidance from the speaker 42 based on the first notification signal is completed. In addition, the display device 43 ends the display based on the third notification signal of the notification information at the same time as the speaker 42 ends the output based on the third notification signal of the voice guidance.

Other Example Embodiments

The present invention is not limited to the configurations illustrated in the above example embodiments. Other representative example embodiments of the present invention will be described below.

(1) In the above example embodiments, the current value suppression processing module 16 sets the multiplying factor K shown in FIGS. 5 and 7 within the range from the first parameter to the second parameter, and multiplies the current command value calculated by the current PI control module 15 by the multiplying factor K. Example embodiments of the present invention are not limited to this. For example, the current value suppression processing module 16 may be configured or programmed to suppress the current command value calculated by the current PI control module 15 to be no greater than a predetermined threshold value.

Figure 11:
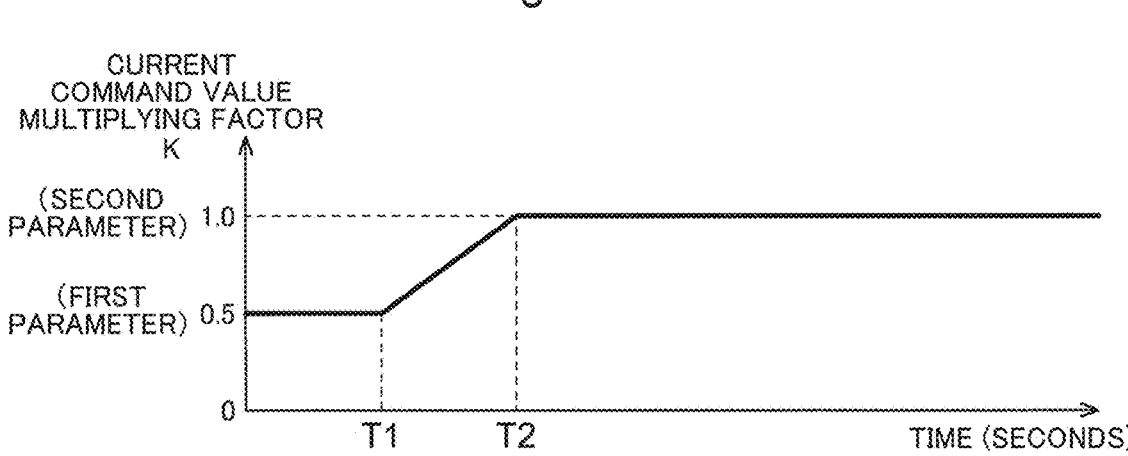
FIG. 11 is a graph showing suppression processing performed to suppress a current command value at the start of automatic steering according to another example embodiment of the present invention.

(2) As described with reference to FIG. 5, the current value suppression processing module 16 of the steering controller 1 is configured or programmed to keep the multiplying factor K at 0.5 (the first parameter) for the period from the start time to the preset time T1, for example. In addition, as described with reference to FIG. 7, the current value suppression processing module 16 of the steering controller 1 is configured or programmed to change the multiplying factor K so that the multiplying factor K approaches 1.0 (the second parameter) as time elapses over the period from the start time of the automatic steering control to the preset time T1. Example embodiments of the present invention are not limited to these example embodiments. For example, as shown in FIG. 11, the current value suppression processing module 16 of the steering controller 1 may be configured or programmed to keep the multiplying factor K at 0.5 (the first parameter) for the period from the start time of the automatic steering control to the preset time T1 (not the end time), for example. The current value suppression processing module 16 of the steering controller 1 may also be configured or programmed to change the multiplying factor K so that the multiplying factor K approaches 1.0 (the second parameter) as time elapses over the period from the preset time T1 (not the start time) to the present time T2 (the end time), for example. That is to say, the current value suppression processing module 16 of the steering controller 1 may be configured or programmed to keep the multiplying factor K (the target steering parameter) at the first parameter for at least a preset period from the start time (to the preset time T1) within the period from the start time to the end time, for example. The current value suppression processing module 16 of the steering controller 1 may also be configured or programmed to change the multiplying factor K (the target steering parameter) so that the multiplying factor K approaches the second parameter as time elapses over at least a predetermined period to the end time (the preset time T1 to the preset time T2) within the period from the start time to the end time.

Figure 12:
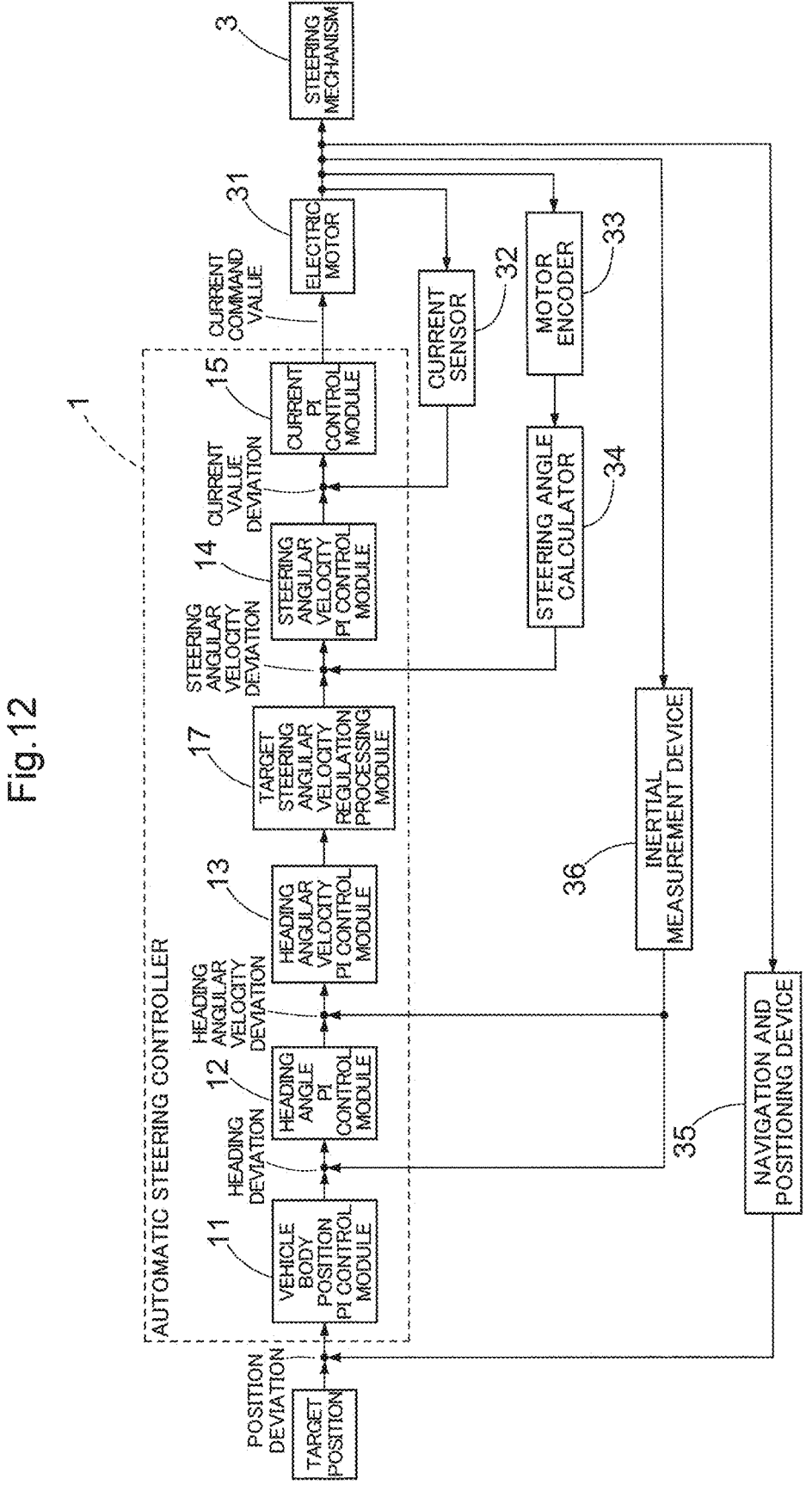
FIG. 12 is a block diagram showing automatic steering control in a steering controller according to another example embodiment of the present invention.

(3) In the example embodiments described above with reference to FIG. 4, the heading angular velocity PI control module 13 calculates a heading angular velocity deviation between the target heading angular velocity calculated by the heading angle PI control module 12 and the actual heading angular velocity calculated by the inertial measurement device 36. The heading angular velocity PI control module 13 calculates a target steering angular velocity of the steered wheels to turn the agricultural field work vehicle in accordance with the target heading angular velocity, based on the heading angular velocity deviation. The target steering angular velocity of the steered wheels is a target amount of change in the steering angle of the steered wheels per unit time. The target amount of change in the steering angle of the steered wheels per unit time is equivalent to the "first angular velocity". As shown in FIG. 12, the steering controller 1 may be configured or programmed to suppress the first angular velocity when performing suppression processing. In the example embodiment shown in FIG. 12, a target steering angular velocity regulation processing module 17 is provided instead of the current value suppression processing module 16. The target steering angular velocity regulation processing module 17 performs processing to suppress abrupt movements of the steering wheel 3A at the start time of the automatic steering control. For example, the target steering angular velocity regulation processing module 17 may be configured or programmed to set the multiplying factor K shown in FIGS. 5 and 7 within the range from the first parameter to the second parameter, and multiply the target steering angular velocity calculated by the heading angular velocity PI control module 13 by the multiplying factor K. In addition, for example, the target steering angular velocity regulation processing module 17 may be configured or programmed to suppress the target steering angular velocity calculated by the heading angular velocity PI control module 13 to be no greater than a predetermined threshold value. As a result, the steering controller 1 is configured or programmed to, when the steering controller 1 changes its state from the non-controlling state to the automatic control state, output the first angular velocity serving as a target steering parameter so that the amount of change per unit time in the steering amount of the steering tool (for example, the steering wheel 3A) is below a predetermined threshold value. In this case, the at least one target steering parameter according may be the first angular velocity. It is also possible to use a configuration in which both the current value suppression processing module 16 and the target steering angular velocity regulation processing module 17 are provided in the example embodiment shown in FIG. 12. In this case, the at least one target steering parameter may include the current command value for the electric motor 31 and the first angular velocity.

Figure 13:
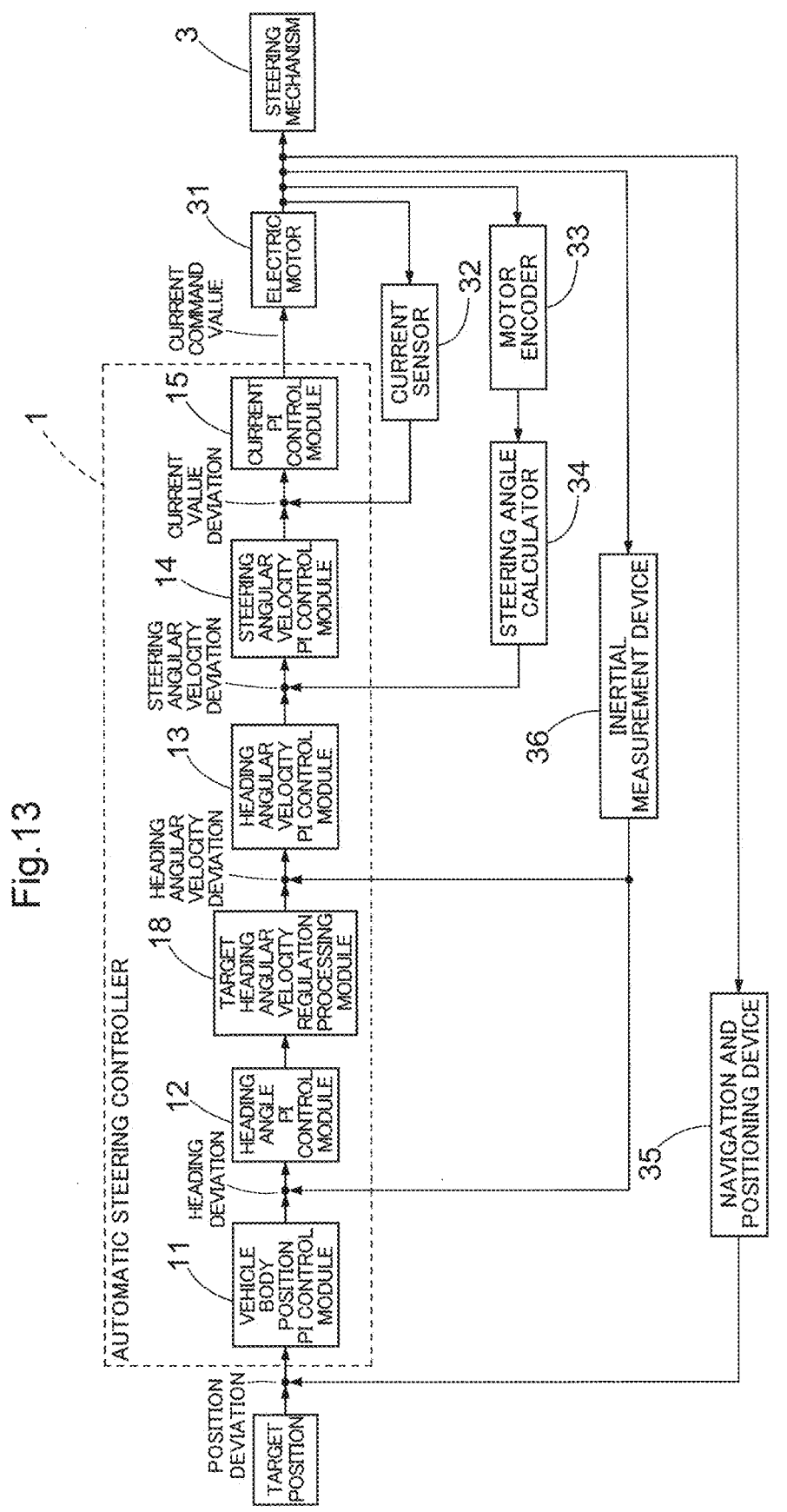
FIG. 13 is a block diagram showing automatic steering control in a steering controller according to another example embodiment of the present invention.

(4) In the example embodiment described above with reference to FIG. 4, the heading angle PI control module 12 calculates a heading deviation amount between the target heading calculated by the vehicle body position PI control module 11 and the actual heading of the agricultural field work vehicle measured by the inertial measurement device 36. Thereafter, the heading angle PI control module 12 calculates a target heading angular velocity to align the heading of the agricultural field work vehicle with the target heading based on the heading deviation amount. The target heading angular velocity to align the heading of the agricultural field work vehicle with the target heading is equivalent to the "second angular velocity". As shown in FIG. 13, the steering controller 1 may be configured or programmed to suppress the second angular velocity when performing suppression processing. In the example embodiment shown in FIG. 13, a target heading angular velocity regulation processing module 18 is provided instead of the current value suppression processing module 16. The target heading angular velocity regulation processing module 18 performs processing to suppress abrupt movements of the steering wheel 3A at the start time of the automatic steering control. For example, the target heading angular velocity regulation processing module 18 may be configured or programmed to set the multiplying factor K shown in FIGS. 5 and 7 within the range from the first parameter to the second parameter, and multiply the target heading angular velocity calculated by the heading angle PI control module 12 by the multiplying factor K. In addition, for example, the target heading angular velocity regulation processing module 18 may be configured or programmed to suppress the target heading angular velocity calculated by the heading angle PI control module 12 to be no greater than a predetermined threshold value. In this case, the at least one target steering parameter may be the second angular velocity. It is also possible to use a configuration in which both the current value suppression processing module 16 and the target heading angular velocity regulation processing module 18 are provided in the example embodiment shown in FIG. 13. In this case, the at least one target steering parameter may include the current command value for the electric motor 31 and the second angular velocity.

(5) The motor encoder 33 is shown as the "first detector". The first detector may be, for example, an encoder that detects the steering amount of the steering wheel 3A. In short, the first detector is configured to be able to detect at least one of the drive amount of the steering driver (for example, the electric motor 31) and the steering amount of the steering tool (for example, the steering wheel 3A). The steering angle calculator 34 may be configured or programmed to calculate the angular velocity of the steered wheels based on the detection value detected by the first detector.

(6) The first detector may be configured to, for example, detect the steering amount of the steering wheel 3A. The steering wheel 3A is shown as the "steering tool". The steering tool may be, for example, a steering lever. When the steering tool is a steering lever, the first detector may be configured to detect the steering amount of the steering lever.

(7) The electric motor 31 is shown as the "steering driver". The steering driver may include, for example, a hydraulic motor. When the steering driver is a hydraulic motor, the at least one target steering parameter may include, for example, the opening degree of the hydraulic valve for the hydraulic motor.

(8) In the example embodiment described above with reference to FIGS. 2 and 3, the steering controller 1 determines whether or not the conditions #01 for transition to the automatic steering are met in the preparation mode. At this time, the operator performs manual steering so as to align the attitude and heading of the agricultural field work vehicle with a preset reference heading. The preset reference heading is, for example, a reference heading that has been set based on two points, the start point and the end point, of a teaching travel. Example embodiments of the present invention are not limited to this example embodiment, and the target heading of the automatic steering does not have to be a preset reference heading. For example, it is possible to use a configuration with which, if the operator travels in the same direction for the predetermined distance D1 or for the preset time (e.g. three to five seconds), the target heading may be set to that direction. It is also possible to use a configuration with which, when the target heading that matches the direction is set, the control mode of the steering controller 1 is switched from the manual steering mode to the automatic steering mode.

(9) It is possible to use a configuration in which the inertial measurement device 36 described above based on FIG. 1 is not provided. In this case, the second detector may include, for example, the navigation and positioning device 35. That is to say, the target amount of change in the orientation of the body of the vehicle may be calculated based on the difference per unit time of the positioning data output by the navigation and positioning device 35.

(10) The multiplying factor K calculated in FIGS. 5, 7, and 11 is set to 0.5, which is the first parameter, and to 1.0, which is the second parameter, for example. Example embodiments of the present invention are not limited to this example embodiment, and the values of the first parameter and the second parameter can be changed as desired.

The configurations disclosed in the above example embodiments (including the other example embodiments, the same applies below) can be applied in combination with configurations disclosed in other example embodiments unless a contradiction arises. In addition, the example embodiments disclosed herein are merely examples, and the present invention is not limited to these example embodiments and can be modified as appropriate without departing from the scope of the present invention.

Example embodiments of the present invention are applicable to notification devices for work vehicles and agricultural field work vehicles including the notification devices.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural field work vehicle capable of performing automatic steering to travel along a target route, the agricultural field work vehicle comprising:

a steered wheel;

a steering mechanism including a steering tool capable of accepting a manual operation and operable to perform a steering operation to steer the steered wheel;

an automatic steering controller configured or programmed to change a state thereof between a non-controlling state in which the automatic steering is not performed and an automatic control state in which the automatic steering is performed, and output at least one target steering parameter used to travel along the target route in the automatic control state; and a steering driver to perform drive control on the steering mechanism based on the at least one target steering parameter when the automatic steering controller is in the automatic control state;

the steering tool being configured to change a steering amount thereof in conjunction with the drive control performed by the steering driver; and the automatic steering controller being configured or programmed to perform suppression processing to suppress the at least one target steering parameter in response to a state change from the non-controlling state to the automatic control state.

2. The agricultural field work vehicle according to claim 1, wherein the steering driver includes an electric motor;

the at least one target steering parameter includes a current value for the electric motor; and the automatic steering controller is configured or programmed to suppress the current value when performing the suppression processing.

3. The agricultural field work vehicle according to claim 1, further comprising:

a steering angle calculator configured or programmed to calculate a steering angle of the steered wheel;

the at least one target steering parameter includes a first angular velocity that is a target amount of change per unit time in the steering angle; and the automatic steering controller is configured or programmed to suppress the first angular velocity when performing the suppression processing.

4. The agricultural field work vehicle according to claim 3, further comprising:

a first detector configured to detect at least either a drive amount of the steering driver or a steering amount of the steering tool; wherein the steering angle calculator is configured or programmed to calculate the steering angle based on a detection value detected by the first detector.

5. The agricultural field work vehicle according to claim 1, further comprising:

a second detector configured to detect an orientation of a body of the agricultural field work vehicle; wherein the at least one target steering parameter includes a second angular velocity that is a target amount of change per unit time in the orientation of the body; and the automatic steering controller is configured or programmed to suppress the second angular velocity when performing the suppression processing.

6. The agricultural field work vehicle according to claim 1, wherein the automatic steering controller is configured or programmed to output the at least one target steering parameter in response to a state change from the non-controlling state to the automatic control state so that an amount of change per unit time in a steering amount of the steering tool falls below a predetermined threshold value.

7. The agricultural field work vehicle according to claim 1, wherein the automatic steering controller is configured or programmed to perform the suppression processing from a start time at which the suppression processing is started to an end time at which a preset time has elapsed from the start time; and the automatic steering controller is configured or programmed to set the at least one target steering parameter to a first parameter at the start time, and to set the at least one target steering parameter to a second parameter greater than the first parameter at the end time.

8. The agricultural field work vehicle according to claim 7, wherein the automatic steering controller is configured or programmed to keep the at least one target steering parameter at the first parameter for at least a preset period from the start time within a period from the start time to the end time.

9. The agricultural field work vehicle according to claim 7, wherein the automatic steering controller is configured or programmed to change the at least one target steering parameter to approach the second parameter as time elapses over at least a predetermined period to the end time within a period from the start time to the end time.

10. The agricultural field work vehicle according to claim 1, wherein the automatic steering controller in the non-controlling state is configured or programmed to change the state thereof to the automatic control state when the agricultural field work vehicle has travelled in a same direction for a predetermined distance or time based on manual operation performed on the steering tool.

<div align="center">* * * * *</div>